US010295107B2

(12) United States Patent
Fouard et al.

(10) Patent No.: US 10,295,107 B2
(45) Date of Patent: May 21, 2019

(54) SYSTEMS AND METHODS FOR DUCT PROTECTION

(71) Applicant: The Boeing Company, Chicago, IL (US)

(72) Inventors: Jean-Michel I. Fouard, Marysville, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 384 days.

(21) Appl. No.: 15/192,086

(22) Filed: Jun. 24, 2016

(65) Prior Publication Data

US 2017/0370516 A1   Dec. 28, 2017

(51) Int. Cl.
*F16L 57/00*   (2006.01)
*F16L 59/16*   (2006.01)

(52) U.S. Cl.
CPC .............. *F16L 57/00* (2013.01); *F16L 59/168* (2013.01)

(58) Field of Classification Search
CPC ......... F16L 57/005; F16L 57/00; F16L 57/02; F16L 35/00; F16L 59/168
USPC ............ 285/260, 286.2, 294.1, 294.2, 294.3, 285/294.4, 296.1, 293.1
See application file for complete search history.

(56) References Cited

U.S. PATENT DOCUMENTS

| | | | |
|---|---|---|---|
| 2,330,039 A * | 9/1943 | Feenstra | F16L 13/0236 285/288.1 |
| 2,595,408 A * | 5/1952 | Quest | F16L 11/02 138/128 |
| 3,156,099 A * | 11/1964 | Dailey | E02B 13/00 24/DIG. 50 |
| 4,257,630 A * | 3/1981 | Bartell | B29C 65/18 285/21.2 |
| 4,335,905 A | 6/1982 | Bac | |
| 4,802,509 A * | 2/1989 | Brandolf | B29C 61/0616 138/110 |
| 4,848,409 A | 7/1989 | Jahnke, Jr. | |

(Continued)

FOREIGN PATENT DOCUMENTS

| | | |
|---|---|---|
| CN | 201531711 | 7/2010 |
| SU | 1080237 | 3/1984 |
| WO | 2011075541 A1 | 6/2011 |

OTHER PUBLICATIONS

European Search Report for related Application No. 17170374.7-1754, dated Nov. 20, 2017, 9 Pages.

(Continued)

*Primary Examiner* — Aaron M Dunwoody
(74) *Attorney, Agent, or Firm* — Armstrong Teasdale LLP

(57) ABSTRACT

Methods and systems for protecting a duct joint are provided. An assembly for protecting a joint formed between a first duct and an adjacent second duct includes a first blanket member coupled about the first duct and a second blanket member coupled about the second duct, wherein the second blanket member extends from the first blanket member. The assembly also includes a continuous strap coupled to the first blanket member and to the second blanket member. The strap is configured to couple the first blanket member to the second blanket member such that a load path is provided from the second blanket member to the first blanket member during a duct burst event.

19 Claims, 7 Drawing Sheets

(56) References Cited

U.S. PATENT DOCUMENTS

| | | | |
|---|---|---|---|
| 4,930,543 A * | 6/1990 | Zuiches | F16L 35/00 137/375 |
| 5,137,230 A | 8/1992 | Coffinberry | |
| 5,413,385 A * | 5/1995 | Hilbush, III | F16L 55/175 264/32 |
| 6,059,319 A * | 5/2000 | Wyke | B29C 65/344 219/535 |
| 6,062,610 A | 5/2000 | Andersson | |
| 6,286,876 B1 * | 9/2001 | Jasperse | B64F 1/362 138/156 |
| 6,627,561 B1 | 9/2003 | Wulliman et al. | |
| 6,848,720 B2 | 2/2005 | Carns et al. | |
| 6,907,907 B2 * | 6/2005 | Maida | F16L 59/106 138/149 |
| 7,222,888 B1 * | 5/2007 | Piety | F16L 11/122 138/118 |
| 7,658,983 B2 | 2/2010 | Mormont et al. | |
| 8,387,748 B2 | 3/2013 | Richardson et al. | |
| 8,454,056 B2 | 6/2013 | Fernandes | |
| 8,567,064 B1 * | 10/2013 | Wright | F16L 31/00 285/260 |
| 9,689,522 B2 * | 6/2017 | Bichler | F16L 55/1651 |
| 9,803,303 B2 * | 10/2017 | Sheehan | F16L 59/168 |
| 2004/0016467 A1 * | 1/2004 | Blackmore | F16L 55/179 138/99 |
| 2004/0151922 A1 | 8/2004 | Cohen et al. | |
| 2004/0239107 A1 * | 12/2004 | Perlatti | B60P 3/2265 285/117 |
| 2005/0046183 A1 * | 3/2005 | Adams | F16L 31/00 285/260 |
| 2005/0052018 A1 | 3/2005 | Pichotta | |
| 2006/0284018 A1 | 12/2006 | Carns et al. | |
| 2007/0063509 A1 * | 3/2007 | Gronquist | F16L 13/0272 285/294.2 |
| 2007/0063510 A1 * | 3/2007 | Gronquist | F16L 55/17 285/294.2 |
| 2007/0104927 A1 * | 5/2007 | Yabe | F16L 57/00 428/194 |
| 2008/0307737 A1 | 12/2008 | Pirogovsky et al. | |
| 2009/0102187 A1 | 4/2009 | Carns et al. | |
| 2010/0037974 A1 | 2/2010 | Fernandes et al. | |
| 2010/0084035 A1 | 4/2010 | Binet et al. | |
| 2010/0147446 A1 | 6/2010 | Ciolczyk et al. | |
| 2011/0264399 A1 | 10/2011 | Thayer et al. | |
| 2012/0018014 A1 | 1/2012 | Fernandes et al. | |
| 2014/0013571 A1 * | 1/2014 | Bond, III | F16L 57/00 29/428 |
| 2015/0027623 A1 * | 1/2015 | Malloy | F16L 57/00 156/235 |
| 2015/0285423 A1 * | 10/2015 | Bureau | D03D 3/02 138/97 |
| 2016/0230670 A1 * | 8/2016 | Wheaton | F02C 7/32 |
| 2018/0169933 A1 * | 6/2018 | LaPorte | B29C 61/0625 |

OTHER PUBLICATIONS

Great Britain Examination Report for related application GB1413705.3 dated Oct. 12, 2015; 2 pp.

Great Britain Search Report for related application GB1413705.3 dated Jan. 20, 2015, 4 pp.

Great Britain Examination Report for related application GB1413705.3 dated Jul. 9, 2015; 2 pp.

* cited by examiner

SYSTEMS AND METHODS FOR DUCT PROTECTION

BACKGROUND

The field of the disclosure relates generally to duct protection, and more specifically, to methods and systems for protection of a joint formed by adjacent duct sections.

At least some known vehicles and facilities include ducts for channeling a flow of hot air, gases, or other fluids through the vehicle or the facility. Often such ducts are positioned near structures that may be sensitive to heat and/or moisture. As such, if a rupture or burst in a duct occurs near such a structure, fluids escaping from the fractured duct, and/or debris that break off from the duct. In some known vehicles, a structural shielding system is used to create a physical barrier to separate and protect sensitive structures from ducts. However, a structural shielding system can be difficult or cumbersome to install, may be physically heavy, and/or expensive to manufacture or maintain.

At least some known duct systems include a main duct and a branch duct extending therefrom to form a T-joint around which a woven blanket is wrapped to protect the surrounding structures during a duct burst event. However, at least some known woven blankets include a complex lay-up process requiring multiple templates. Additionally, such woven blankets require additional manufacturing steps to make the complex fabric patterns. Each fabric layer can contain hoop stresses and pressure in the radial direction relative to each centerline of the T-joint.

BRIEF DESCRIPTION

In one aspect, a blanket assembly for protecting a joint formed between a first duct and an adjacent second duct is provided. The assembly includes a first blanket member coupled about the first duct and a second blanket member coupled about the second duct, wherein the second blanket member extends from the first blanket member. The assembly also includes a continuous strap coupled to the first blanket member and to the second blanket member. The strap is configured to couple the first blanket member to the second blanket member such that a load path is provided from the second blanket member to the first blanket member during a duct burst event.

In another aspect, a method of maintaining the integrity of a duct joint is provided. The method includes applying a compressive force to a first duct via a first blanket member. The method also includes applying a compressive force to a second duct coupled to the first duct at joint via a second blanket member. The compressive forces are applied using a strap that is continuous between opposing ends thereof and that is coupled to the first blanket member and to the second blanket member. The method further includes directing a load path from the second duct to the first duct via the strap to maintain joint integrity of the first duct and the second duct.

In yet another aspect, a vehicle is provided. The vehicle includes a first duct, a second duct coupled to the first duct to form a joint therebetween. The vehicle may be an automobile, a watercraft, a sailcraft, an aircraft, and/or a spacecraft. The vehicle also includes a joint protection assembly including a first blanket member coupled about the first duct and a second blanket member coupled about the second duct, wherein the second blanket member extends from the first blanket member. The joint protection assembly also includes a continuous strap coupled to the first blanket member and to the second blanket member. The strap is configured to couple the first blanket member to the second blanket member such that a load path is provided from the second blanket member to the first blanket member during a duct burst event.

The features, functions, and advantages that have been discussed can be achieved independently in various examples or may be combined in yet other examples, further details of which can be seen with reference to the following description and drawings.

DETAILED DESCRIPTION

The implementations described herein include a system or device that is able to maintain a compressive force between adjacent duct sections in the event of a coupling separation to prevent rapid duct separation, to extend the time of decompression, and to protect any sensitive structures surrounding the duct by changing the direction of the load path. The examples described herein include a blanket assembly having a first blanket member coupled about a first duct and a second blanket member coupled about a second duct such that the second blanket member extends from the first blanket member. The implementations also include a continuous strap coupled to the first blanket member and to the second blanket member such that a load path is provided from the second blanket member to the first blanket member during a duct burst event.

Typically, when a blanket is used, a complex interface is required to sew each sub-assembly to achieve containment of debris at a T-joint. This interface is a weak point and may be inefficient to transfer loads from the branch duct into the main duct because the load paths are interrupted where the T-joint is located.

Joint integrity between the adjacent ducts is considered to be maintained when the blanket assembly prevents a sudden separation of the duct sections that would flood the area surrounding the joint with high temperature and/or high pressure fluids. The disclosed blanket assembly comprises a first and a second blanket member formed from multiple different layers of material stitched together. The disclosed blanket assembly may also be formed from a single layer of woven material to reduce cost and time required for production. Further, the disclosed blanket assembly facilitates transfer of compressive forces and load path, which may facilitate extending a service lifetime of the duct. Although the examples described above are described in relation to a vehicle, the examples may be implemented in stationary applications such as buildings having duct systems.

The systems and methods described herein enable protecting a duct through which is channeled a high temperature and/or high pressure fluid. More specifically, the systems and methods described herein enable duct protection of a vehicle. As used herein, the term "vehicle" refers to any mobile machine capable of transporting passengers, cargo, and/or equipment. For example, a vehicle may be included, but is not limited to only being an automobile (e.g., car, bus, and truck), a watercraft, a sailcraft, an aircraft, and/or a spacecraft. In another implementation, the systems and methods described herein enable protection of non-mobile ducts, such as, but not limited to, those used in buildings.

Figure 1:
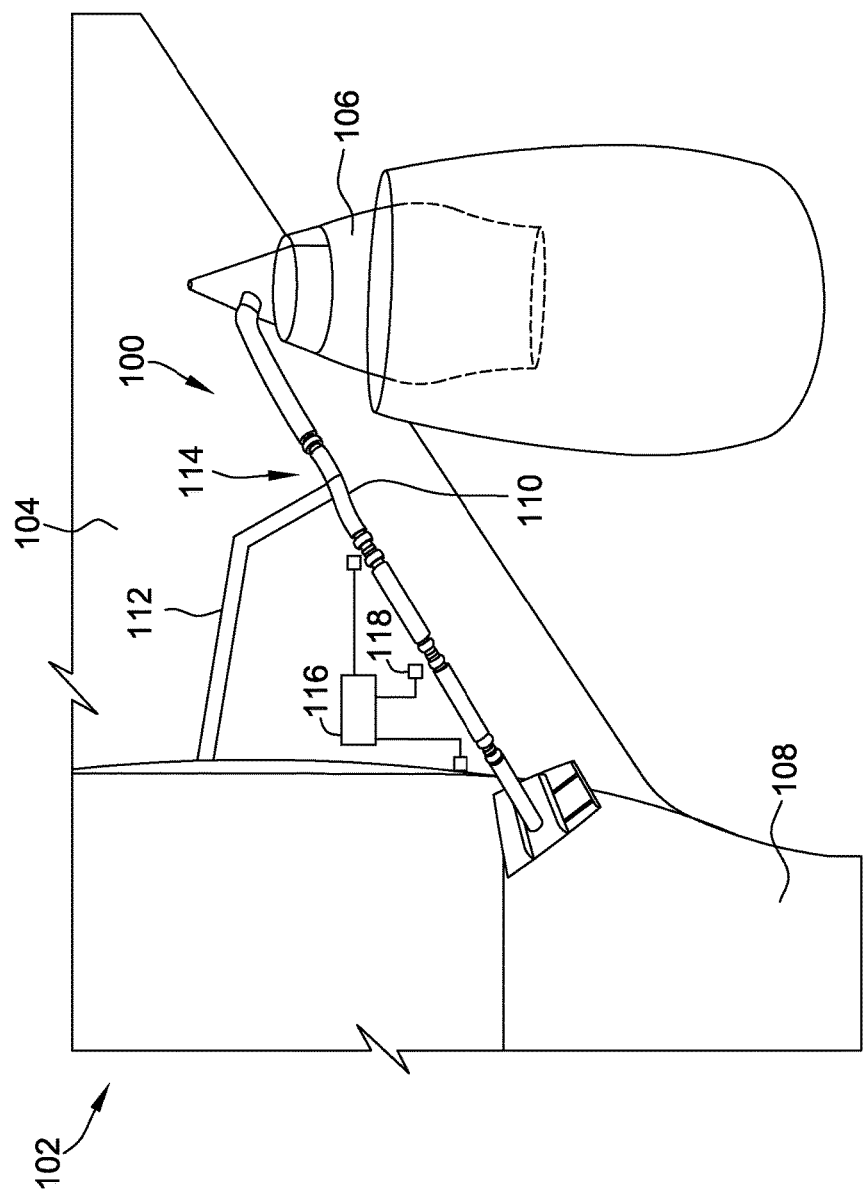
FIG. 1 is a top view of an exemplary duct system mounted within a vehicle.

FIG. 1 is a top view of duct system 100 mounted within a structure that channels a high pressure fluid from one location to another. In the exemplary example, duct system 100 is used within a vehicle, and specifically, an aircraft 102. Aircraft 102 may include, but is not limited to only including, airplanes, unmanned aerial vehicles (UAVs), gliders, helicopters, and/or any other vehicle that travels through airspace. However, it is contemplated that duct system 100 may be used in any structure that channels a high pressure fluid and is not limited for use only within vehicles or aircraft. After reviewing this disclosure, it will be apparent to those of skill in the art that without departing from the disclosure, the assembly can be used in buildings or platforms, and other dwellings.

In the exemplary example, duct system 100 is located within a wing 104 of aircraft 102 and facilitates channeling bleed air from an engine 106 coupled to wing 104 to an aircraft fuselage 108 for use in other aircraft 102 systems. As shown in FIG. 1, duct system 100 includes a main or first duct 110 extending between engine 106 and fuselage 108 and a branch or second duct 112 extending between first duct 110 and fuselage 108. As used herein, the term "duct" refers to a fluid transport conduit and may be made up of a plurality of duct segments. First duct 110 and second duct 112 form a joint 114 where second duct 112 extends from first duct 110. Alternatively, duct system 100 may be any duct system capable of channeling air, gas, and/or liquid through a structure. Duct system 100 may be any size, and may be formed from any material (e.g., titanium, stainless steel, or nickel alloy) that is capable of channeling air, gas, and/or liquid through a vehicle. In some examples, duct system 100 channels at least one of a high pressure flow, a low pressure flow, a high temperature flow, and a low temperature flow therethrough.

As shown in FIG. 1, duct system 100 also includes a duct leakage overheat detection system (DLODS) 116 that is configured to detect a leakage from joint 114 and to terminate the fluid flow within ducts 110 and 112. DLODS 116 includes at least one sensor 118 positioned adjacent to joint 114. More specifically, in one implementation, sensor 118 is positioned a distance from joint 114 such that, in the event of a leakage event, sensor 118 detects the flow being discharged from joint 114. In the exemplary example, sensor 118 is a thermal sensor. Alternatively, sensor 118 can be any sensor used to detect flow or heat characteristics such as, but not limited to, a chemical sensor, a flow sensor, and/or strain gauge. In some examples, sensor 118 is coupled to a display unit (not shown) to enable data collected by sensor 118 to be quickly viewed. Alternatively, sensor 118 is coupled to a remote computing device (not shown) that stores, analyzes, presents, and/or transmits data collected by sensor 118. It should be noted that sensor 118 can be coupled to a display unit and/or a remote computing device via a wired or wireless signal.

Figure 2:
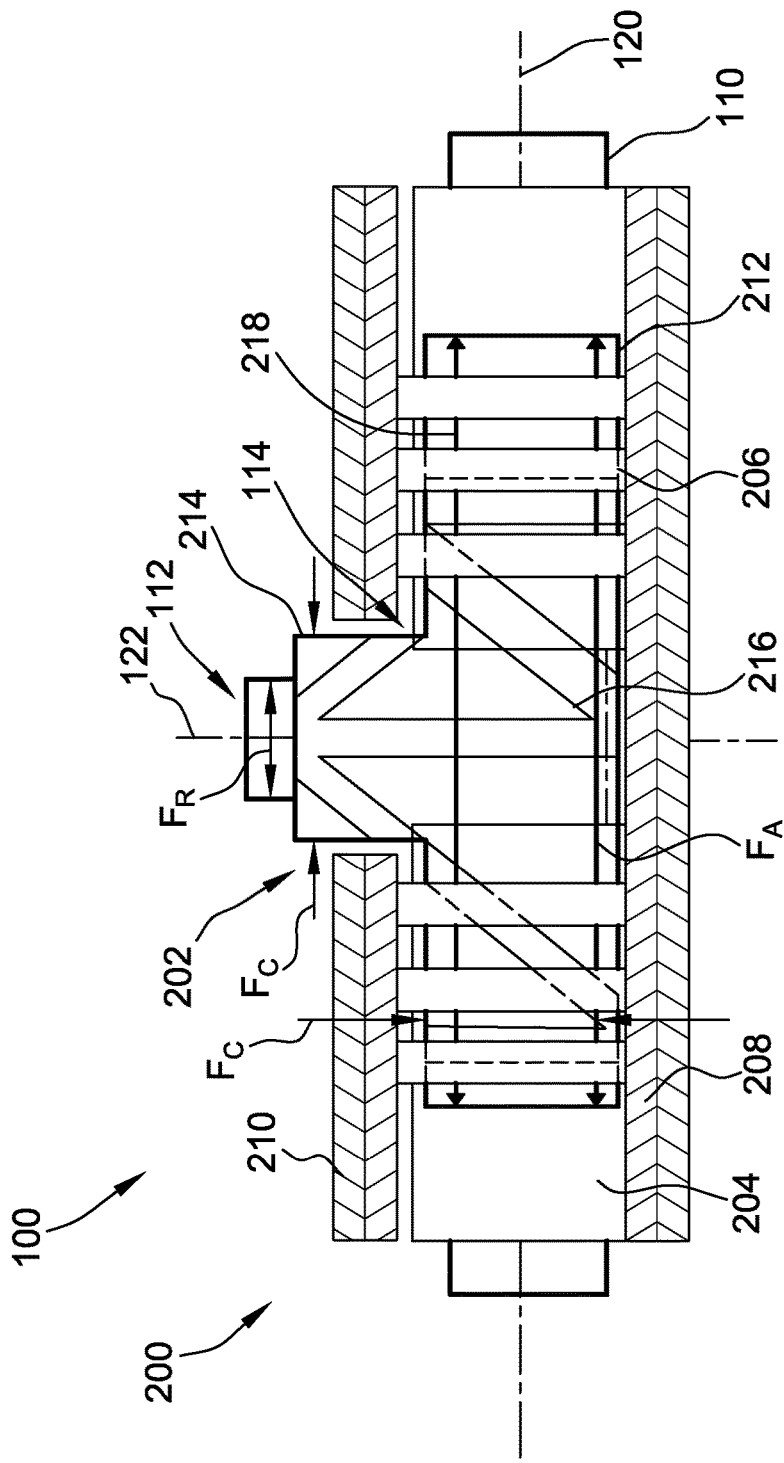
FIG. 2 is a partial cross-sectional view of an exemplary duct protection assembly that may be used with the duct system shown in FIG. 1.
Figure 3:
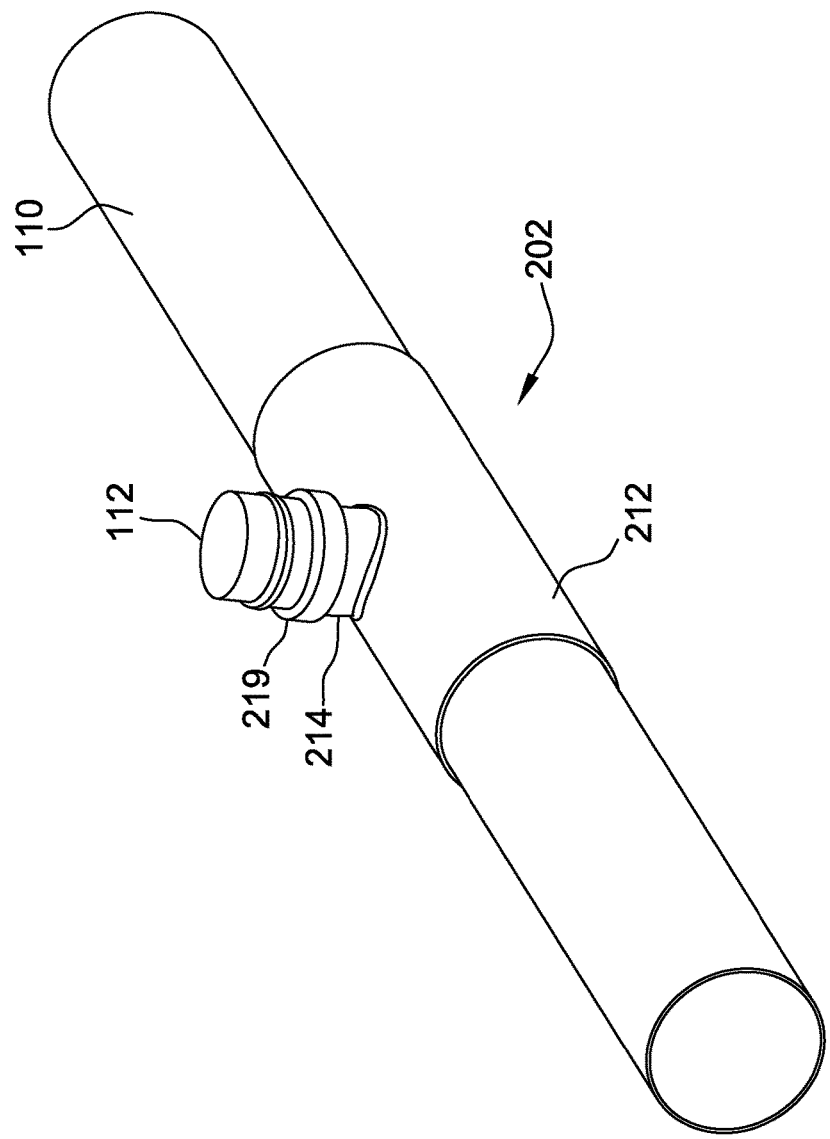
FIG. 3 is a perspective view of an exemplary blanket assembly that may be used with the duct protection assembly shown in FIG. 2.

FIG. 2 is a partial cross-sectional view of an exemplary joint protection assembly 200 that may be used with duct system 100, and FIG. 3 is a perspective view of an exemplary blanket assembly 202 that may be used with joint protection assembly 200 shown in FIG. 2. As described above, duct system 100 includes a first duct 110, an adjacent second duct 112, and a joint 114 formed at a junction of ducts 110 and 112. In one implementation, duct system 100 is configured to channel a high pressure and/or high temperature fluid therethrough.

In one implementation, joint protection assembly 200 includes a blanket assembly 202 coupled to first duct 110, having a first centerline 120, and to second duct 112, having a second centerline 122. More specifically, blanket assembly 202 is coupled directly to ducts 110 and 112 at joint 114 such that an inner surface of blanket assembly 202 contacts an outer surface of ducts 110 and 112. As described in further detail below, blanket assembly 202 is configured to protect joint 114 by dissipating forces in case of a duct burst event. More specifically, blanket assembly applies a compressive force to both first duct 110 and to second duct 112 such that a load path is provided from second duct 112 to first duct 110 during a duct burst event in second duct 112 to prevent rapid duct separation. Even more specifically, blanket assembly 202 converts or transfers substantially radially-oriented forces of the load path in second duct 112 into substantially axially-oriented forces of the load path in the first duct 110.

Joint protection assembly 200 also includes a ballistic layer 204 coupled to first duct 110 outside blanket assembly 202 and a plurality of securing mechanisms 206, such as, but not limited to, hook and loop straps, coupled about ballistic layer 204. In one implementation, joint protection assembly 200 also includes an insulation layer 208 coupled about ballistic layer 204 and a containment layer 210 coupled about insulation layer 208. Containment layer 210 and insulation layer 208 are shown in cross-section in FIG. 2, and only blanket assembly 202 is shown in FIG. 3 for clarity.

The containment layer 210 is formed from a lightweight, non-porous material capable of sealing and/or retaining air, gas, or liquids. Further, the containment layer 210 is formed from any material having any thickness that facilitates substantially containing and/or sealing flow from ducts 110 and 112. In one implementation, containment layer 210 is formed from a temperature resistant, impermeable material, such as, but not limited to, silicone rubber, such that containment layer 210 facilitates shielding components surrounding joint 114 from exposure to the high temperature and high pressure fluid flow within ducts 110 and 112. In other examples, containment layer 210 is formed from either a silicone coated glass cloth material and/or a substantially flexible polymer coated fabric. Containment layer 210 includes a thickness in the range of ⅛ inch to 1/32 inch. Generally, containment layer 210 is impermeable to a fluid flow such that the fluid is diverted circumferentially and/or axially within joint protection assembly 200 between an outer surface of a component of joint 114 and containment layer 210 until the fluid reaches an axial end of joint protection assembly 200.

Additionally, insulation layer 208 is configured to thermally protect components surrounding joint 114 from heat exposure. Insulation layer 208 may be positioned radially inward from or radially outward of containment layer 210. Further, ballistic layer 204 circumscribes joint 114 to facilitate preventing a fragment of ducts 110 and 112 from separating and impinging components surrounding joint 114. As such, because ballistic layer 204 intercepts the debris before it has a chance to be accelerated by the fluid flow in ducts 110 and 112, ballistic layer 204 facilitates "catching" the debris before it is accelerated to a velocity sufficient to penetrate ballistic layer 204 or any other portion of joint protection assembly 200.

In one implementation, blanket assembly 202 includes a first blanket member 212 coupled about first duct 110 and a second blanket member 214 coupled about second duct 112. As shown in FIGS. 2 and 3, second duct 112 extends substantially perpendicularly away from first duct 110 such that joint 114 is substantially T-shaped. As such, second blanket member 214 extends away from first blanket member 212 in a similar, perpendicular, orientation such that blanket assembly 202 is also substantially T-shaped. In another implementation, second duct 112 and second blanket member 214 extend away from first duct 110 and first blanket member 212, respectively, in any orientation that facilitates operation of blanket assembly 202 as described herein.

In one implementation, blanket assembly 202 also includes a strap 216 coupled to first and second blanket members 212 and 214. As described herein, strap 216 is continuous between opposing ends such that strap 216 is a single-piece component. As such, strap 216 does not include multiple segments nor seams to couple such segments to each other as such seams between segments may represent a weak point along the strap. Because strap 216 is a continuous, single-piece component, its strength is maintained along its length. Strap 216 coupled first blanket member 212 to second blanket member 214 and is also configured to apply a compressive force to first and second ducts 110 and 112 such that a load path 218 is provided from second blanket member 214 to first blanket member 212 during a duct burst event to prevent rapid duct separation. More specifically, strap 216 is configured to prevent duct separation by anchoring second duct 112 to first duct 110 such that a majority of any radial forces, with respect to first duct centerline 120, caused by a duct burst event are converted to substantially axial forces along centerline 120. As such, a substantially axial load path 218 is provided to prevent separation and to allow any escaping gases to dissipate into any of layers 204, 208, and 210.

As shown in FIG. 3, blanket assembly 202 also includes a duct securing mechanism 219 to couple second blanket member 214 to second duct 112. More specifically, in one implementation, duct securing mechanism 219 includes at least one of a hook and loop strap and a clamp to secure second blanket member 214 to second duct 112. In one implementation, duct securing mechanism 219 is integrally formed with blanket assembly 202. Alternatively, duct securing mechanism 219 may be a separate component from blanket assembly 202. Generally, whether duct securing mechanism 219 is separate from blanket assembly 202 is dependent on the length of second duct 112. A shorter second duct 112 will more often use a separate duct securing mechanism 219 than a relatively longer second duct 112 due the limited area available for an integral duct securing mechanism 219 on a short second duct 112.

Figure 4:
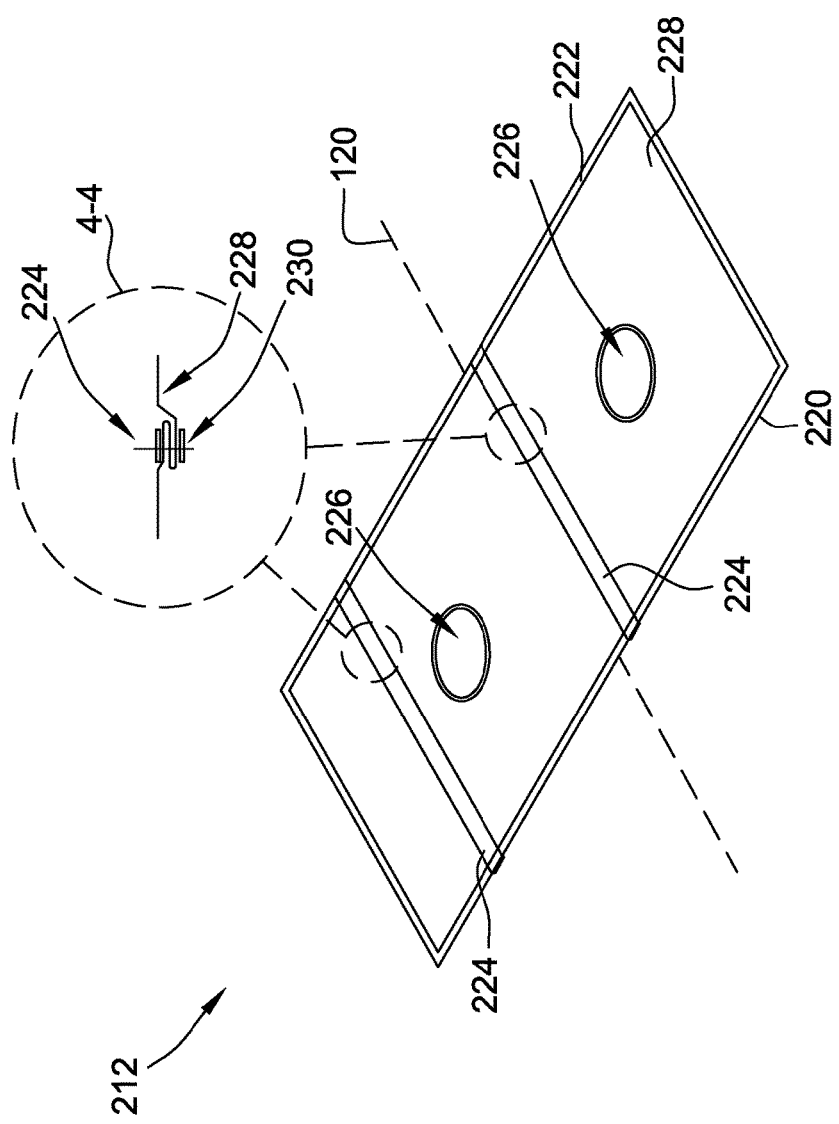
FIG. 4 is a perspective view of an exemplary first blanket member of the blanket assembly shown in FIG. 3.

FIG. 4 is a perspective view of first blanket member 212 of blanket assembly 202 prior to being coupled to second blanket member 214 and to first duct 110. In one implementation, first blanket member 212 includes a first side 220, an opposing second side 222, and at least a pair of reinforcing seams 224 extending between sides 220 and 222. First blanket member 212 also includes a pair of second duct openings 226 that are configured to receive second duct 112 therethrough. More specifically, as described in further detail below, second blanket member 214 is coupled to first blanket member 212 at one of the pair of openings 226. In operation, second duct 112 is inserted through the opening 226 having second blanket member 214 coupled thereto and first blanket member 212 is then wrapped around first duct 110 such that the remaining opening 226 is then positioned over second duct 112 to index blanket assembly 202 and to prevent circumferential and axial movement of blanket assembly 202.

Inset 4-4 in FIG. 4 is a cross-sectional view of reinforcing seams 224. In one implementation, first blanket member 212 is formed from a single layer 228 of woven fabric, such as, but not limited to, carbon fiber, ceramic fiber, fiberglass, and any combinations. Reinforcing seams 224 are formed by folding layer 228 unto itself two times and inserting a strip of binding material 230 in-between the folds to serve as backing for stitches. In one implementation, binding material 230 is also applied to the outside of reinforcing seams 224 such that the stitching is through three layers of fabric 228 and four layers of binding material 230. Such a configuration provides sufficient strength to reinforcing seams 224 without increasing the thickness of first blanket member 212 above what is desired. In other implementations, reinforcing seams 224 include any number of fabric layers 228 and binding material 230 to facilitate operation of reinforcing seams 224 as described herein. Reinforcing seams 224 are oriented axially with respect to centerline 120 and are positioned such that one of openings 226 is located between seams 224.

Figure 5:
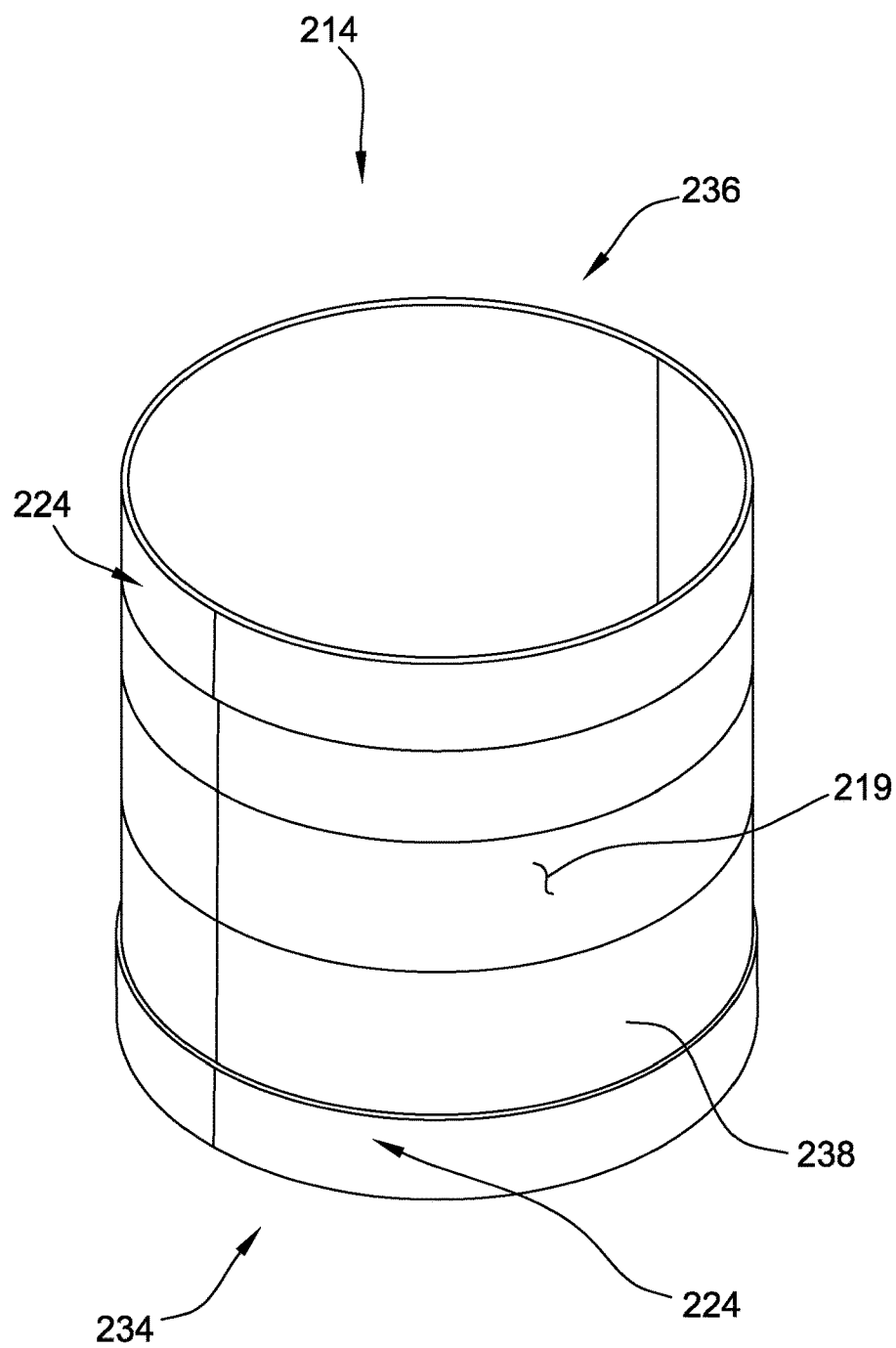
FIG. 5 is a perspective view of an exemplary second blanket member of the blanket assembly shown in FIG. 3.

FIG. 5 is a perspective view of second blanket member 214 of blanket assembly 202 prior to being coupled to first blanket member 212 and to second duct 112. In one implementation, second blanket member 214 includes a first end 234 and an opposing second end 236. Furthermore, second blanket member 214 includes reinforcing seams 224, substantially similar to seams 224 in first blanket member 212, proximate at least one of ends 234 and 236. More specifically, second blanket member 214 includes reinforcing seam 224 at at least second end 236 away from first blanket member 212 based on the length of second blanket member 214. Shorter length second blanket members 214 may not include a seam 224 proximate first end 234 because the reinforcing seam 224 at second end 236 satisfies the strength requirement od second blanket member 214.

As described above, duct securing mechanism 219 is coupled to second blanket member 214. In the exemplary implementation, duct securing mechanism 219 includes a hook and loop strap integrally formed with second blanket member 214. In another implementation, duct securing mechanism 219 includes a clamp separable from second blanket member 214. Similar to reinforcing seams 224, whether duct securing mechanism 219 is integrally formed with second blanket member 214 depends on the length of second blanket member 214. Shorter length second blanket members 214 include a separable duct securing mechanism 219, while relatively longer length second blanket members 214 include integrated duct securing mechanisms 219.

In one implementation, second blanket member 214 is formed from a single layer 238 of woven fabric, such as, but not limited to, carbon fiber, ceramic fiber, or fiberglass. In another implementation, second blanket member 214 is formed from any material that facilitates operation of blanket assembly 202 as described herein. Fabric layer 238 is stitched into the final tube shape to facilitate installation on second duct 112. In one implementation, fabric layer 228 of first blanket member 212 is formed from a substantially similar material as fabric layer 238 of second blanket member 214 for simplicity of manufacturing. Alternatively, in cases where either first blanket member 212 or second blanket member 214 is desired to have a different strength requirement based on the implementation, fabric layer 228 of first blanket member 212 may be formed from a different material from fabric layer 238 of second blanket member 214. Similarly, fabric layer 228 of first blanket member 212 includes a substantially similar weave pattern as fabric layer 238 of second blanket member 214. Alternatively, fabric layer 228 of first blanket member 212 may include a different weave pattern as fabric layer 238 of second blanket member 214. For example, in one implementation, second blanket member 214 includes a tighter weave pattern than first blanket member 212 to maximize the strength of second blanket member 214 and to facilitate dissipation of energy, in the form of high pressure fluids, through fabric layer 228 of first blanket member 212.

Figure 6:
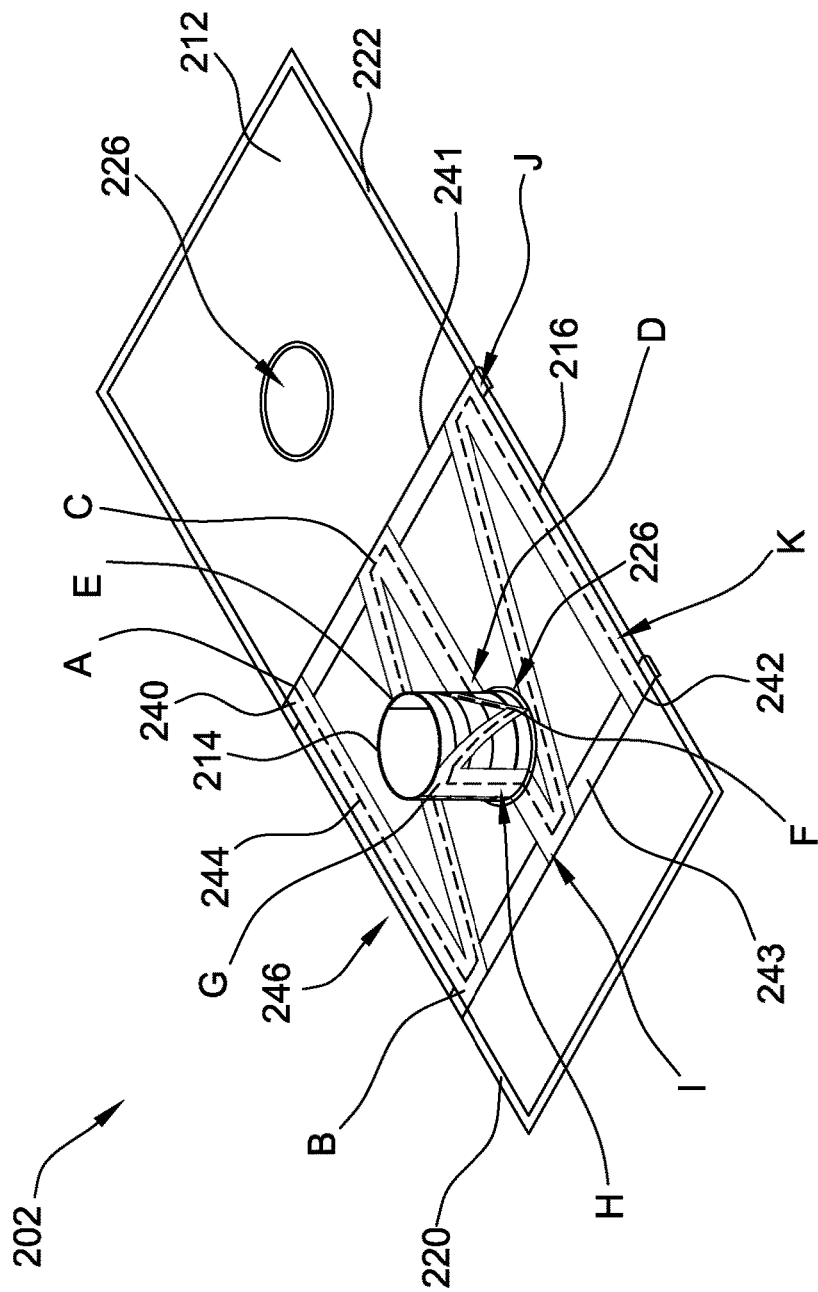
FIG. 6 is a perspective view of the blanket assembly shown in FIG. 3 illustrating a continuous strap.

FIG. 6 is a perspective view of the fully assembled blanket assembly 202 prior to being coupled to ducts 110 and 112. As shown in FIG. 6, blanket assembly 202 includes strap 216 coupled to first blanket member 212 and second blanket member 214 for distributing forces from second duct 112 along first duct 110. In one implementation, strap 216 includes a first end 240 coupled to a first seam 241 of reinforcing seams 224 proximate first side 220 and an opposing second end 242 coupled to the second seam 243 of reinforcing seams 224. As described herein, strap 216 is a single, continuous strap coupled to both first and second blanket members 212 and 214 along a continuous seam 244 between ends 240 and 242. More specifically, strap 216 is coupled to both first and second blanket members 212 and 214 in sequential order between points A-K, wherein point A corresponds to first end 240 and point K corresponds to second end 242. As shown in FIG. 6, strap 216 is coupled to seam 241 at points A, C, and J, and is coupled to seam 243 at points B, I, and K such that strap 216 extends between seams 241 and 243 in a substantially zig-zag (also known as saw-tooth) pattern. Similarly, strap 216 is coupled to second blanket member 214 at points D, E, F, G, H, and I such that strap 216 follows a substantially zig-zag (or saw-tooth) pattern on second blanket member 214. Such a pattern facilitates providing a compressive force to first and second ducts 110 and 112 such that load path 218 (shown in FIG. 2) is provided from second blanket member 214 to first blanket member 212 during a duct burst event to prevent rapid duct separation. Accordingly, strap 216 transfers radial forces, with respect to first duct centerline 120, caused by a duct burst event into substantially axial forces along centerline 120.

Figure 7:
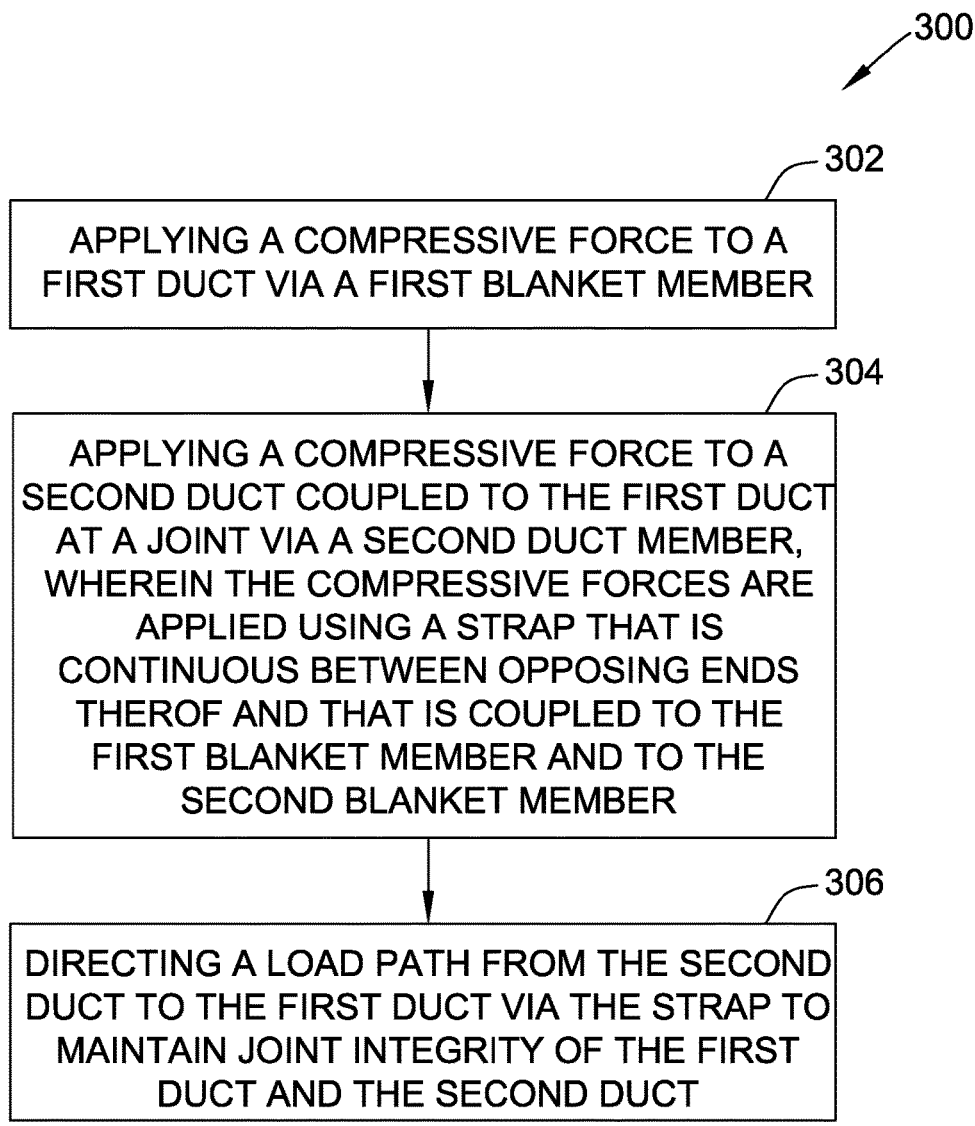
FIG. 7 is a diagram of an exemplary method of maintaining joint integrity using the blanket assembly shown in FIG. 6.

FIG. 7 is a diagram of an exemplary method 300 of maintaining joint integrity using blanket assembly 202. In one implementation, method 300 includes applying 302 a compressive force Fc (shown in FIG. 2) to first duct 110 via first blanket member 212. Method 300 also includes applying 304 a compressive force Fc (shown in FIG. 2) to second duct 112 coupled to first duct 110 at joint 114 via second blanket member 214. Compressive forces Fc are applied 302 and 304 using strap 216 that is continuous between opposing ends 240 and 242 and that is coupled to first blanket member 212 and to second blanket member 214.

Method 300 further includes directing 306 a load path 218 from second duct 112 to first duct 110 via strap 216 to maintain joint integrity of first duct 110 and second duct 112. As described herein, the directing step 306 includes directing the load path 218 between a pair of reinforcing seams 241 and 243 on first blanket member 212. Furthermore, the directing step 306 includes directing the load path in a substantially zig-zag pattern across first blanket member 212 and second blanket member 214. Additionally, the directing step 306 includes converting radially oriented forces Fr (shown in FIG. 2) of the load path 218 in second duct 112 with respect to second duct centerline 122 to axially oriented forces Fa (shown in FIG. 2) of the load path 218 in first duct 110 with respect to first duct centerline 120.

Moreover, as shown in FIG. 2, applying 302 the compressive force Fc to first duct 110 includes extending strap 216 substantially circumferentially about first duct 110 and applying 304 the compressive force Fc to second duct 112 includes extending strap 216 substantially axially about second duct 112.

The implementation described herein include a system or device that is able to maintain a compressive force between adjacent duct sections in the event of a coupling separation to prevent rapid duct separation, to extend the time of decompression, and to protect any sensitive structures surrounding the duct by changing the direction of the load path. The examples described herein include a blanket assembly having a first blanket member coupled about a first duct and a second blanket member coupled about a second duct such that the second blanket member extends from the first blanket member. The examples also include a continuous strap coupled to the first blanket member and to the second blanket member such that a load path is provided from the second blanket member to the first blanket member during a duct burst event.

Joint integrity is considered to be maintained when the blanket assembly prevents a sudden separation of the duct sections that would flood the area surrounding the joint with high temperature and/or high pressure fluids. The disclosed blanket assembly comprises a first and a second blanket member formed from multiple different layers of material stitched together. The disclosed blanket assembly may also be formed from a single layer of woven material to reduce cost and time required for production. Further, the disclosed blanket assembly facilitates transfer of compressive forces and load path, which may facilitate extending a service lifetime of the duct. Although the examples described above are described in relation to a vehicle, the examples may be implemented in stationary applications such as buildings having duct systems.

Although specific features of various examples of the disclosure may be shown in some drawings and not in others, this is for convenience only. In accordance with the principles of the disclosure, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blanket assembly for protecting a joint formed between a first duct and a second duct, said blanket assembly comprising:

a first blanket member configured to be coupled about the first duct, wherein said first blanket member includes a first side, an opposing second side, and a pair of reinforcing seams extending between said first and said second sides;

a second blanket member configured to be coupled about the second duct, wherein said second blanket member extends from said first blanket member; and a strap coupled to said first blanket member and to said second blanket member, wherein said strap includes opposing ends and said strap is continuous between said opposing ends, and wherein said strap is configured to couple said first blanket member to said second blanket member such that a load path is provided from said second blanket member to said first blanket member during a duct burst event.

2. The blanket assembly according to claim 1 wherein said strap extends substantially circumferentially about said first blanket member, when the first blanket member is wrapped around the first duct.

3. The blanket assembly according to claim 2, wherein said strap extends substantially axially along said second blanket member, when the second blanket member is wrapped around the second duct.

4. The blanket assembly according to claim 1, wherein said strap extends between said reinforcing seams in a substantially zig-zag pattern.

5. The blanket assembly according to claim 1, wherein said reinforcing seams include a plurality layers of material and a binding material positioned between each layer of material.

6. The blanket assembly according to claim 1, wherein said first blanket member includes a pair of second duct openings, and wherein said second blanket member is coupled to said first blanket member at one of said pair of openings.

7. The blanket assembly according to claim 1 further comprising a branch securing mechanism configured to couple said second blanket member to said second duct.

8. The blanket assembly according to claim 7, wherein said branch securing mechanism is integrally formed with said second blanket member.

9. A method of maintaining integrity of a duct joint, said method comprising:

applying a compressive force to a first duct via a first blanket member;

applying a compressive force to a second duct coupled to the first duct at a joint via a second blanket member, wherein the compressive forces are applied using a strap that is continuous between opposing ends thereof and that is coupled to the first blanket member and to the second blanket member; and directing a load path from the second duct to the first duct via the strap to maintain joint integrity of the first duct and the second duct.

10. The method of claim 9, wherein directing the load path comprises directing the load path between a pair of reinforcing seams on the first blanket member.

11. The method according to claim 9, wherein directing the load path comprises directing the load path in a substantially zig-zag pattern across the first blanket member and the second blanket member.

12. The method according to claim 9, wherein directing the load path comprises converting radially oriented forces of the load path in the second duct with respect to a second duct centerline to axially oriented forces of the load path in the first duct with respect to a first duct centerline.

13. The method of claim 9, wherein directing the load path comprises directing the load path in a substantially zig-zag pattern between a pair of reinforcing seams on the first blanket member and in a substantially zig-zag pattern across the second blanket member.

14. The method of claim 9, wherein applying the compressive force to the first duct comprises extending the strap substantially circumferentially about the first duct and wherein applying the compressive force to the second duct comprises extending the strap substantially axially about the second duct.

15. A vehicle comprising:

a joint protection assembly comprising:

a first blanket member coupled about a first duct;

a second blanket member coupled about a second duct, the first and second ducts are coupled to form a joint therebetween, wherein said second blanket member extends from said first blanket member; and;

a strap coupled to said first blanket member and to said second blanket member, wherein said strap includes opposing ends and said strap is continuous between said opposing ends, and wherein said strap is configured to couple said first blanket member to said second blanket member such that a load path is provided from said second blanket member to said first blanket member during a duct burst event.

16. The vehicle according to claim 15, wherein said first blanket member includes:

a first side;

an opposing second side;

a pair of reinforcing seams extending between said first and said second sides; and a pair of second duct openings, and wherein said second blanket member is coupled to said first blanket member at one of said pair of openings.

17. The vehicle according to claim 16, wherein said strap extends between said reinforcing seams in a substantially zig-zag pattern across said first blanket member and said second blanket member.

18. The vehicle according to claim 15, wherein said strap extends substantially circumferentially about said first blanket member with respect to a first duct centerline, and wherein said strap extends substantially axially along said second blanket member with respect to a second duct centerline.

19. The vehicle according to claim 15, wherein said first blanket member and said second blanket member each comprise a single layer of a woven material.

* * * * *